No. 651,091. Patented June 5, 1900.
D. WILLIAMS.
HOOK FOR CHAINS.
(Application filed Oct. 10, 1899.)
(No Model.)

Witnesses
John Maupin.
H. J. Riley

Delos Williams Inventor
By his Attorneys,
C. A. Snow & Co.

UNITED STATES PATENT OFFICE.

DELOS WILLIAMS, OF ELLSWORTH, OHIO.

HOOK FOR CHAINS.

SPECIFICATION forming part of Letters Patent No. 651,091, dated June 5, 1900.

Application filed October 10, 1899. Serial No. 733,211. (No model.)

*To all whom it may concern:*

Be it known that I, DELOS WILLIAMS, a citizen of the United States, residing at Ellsworth, in the county of Mahoning and State of Ohio, have invented a new and useful Hook for Chains, of which the following is a specification.

The invention relates to improvements in hooks for chains.

One object of the present invention is to improve the construction of hooks for chains and to provide a simple, inexpensive, and efficient one designed to be arranged at an intermediate point of a chain, adapted to form one of the links thereof, and capable of forming a grapple and of engaging the links of a chain bodily from either side for making hitches for looping up and shortening chains and the like.

A further object of the invention is to provide a device of this character which will obviate the necessity of doubling long chains in cold weather and which may be dragged along the ground without liability of the mouths of the engaging portions of the hooks becoming clogged with accumulation, such as grass, earth, or the like.

The invention consists in the construction and novel combination and arrangement of parts hereinafter fully described, illustrated in the accompanying drawings, and pointed out in the claims hereto appended.

Figure 1:
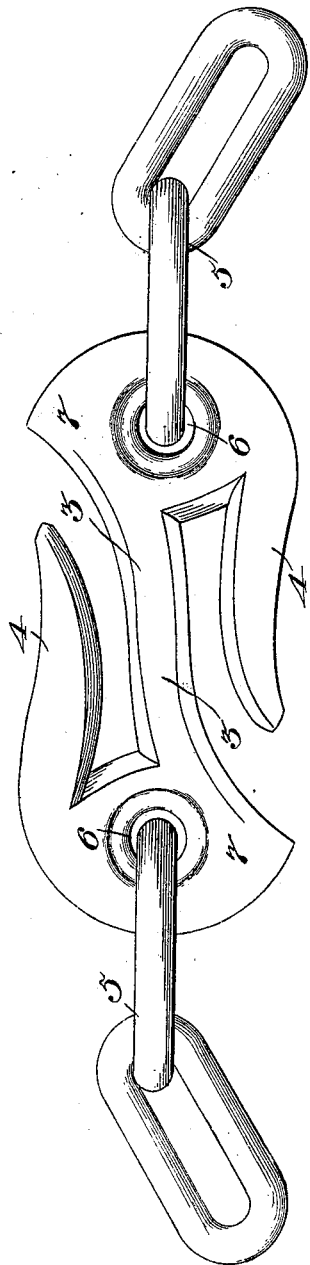
Figure 2:
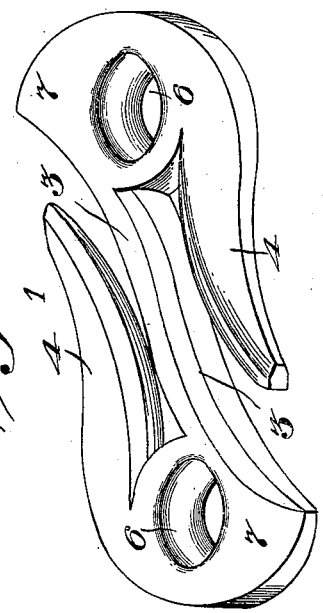

In the drawings, Figure 1 is a plan view of a portion of a chain provided with a hook constructed in accordance with this invention. Fig. 2 is a perspective view of the device detached.

Like numerals of reference designate corresponding parts in both figures of the drawings.

1 designates a double hook comprising a longitudinal body portion or shank 3 and a pair of bills or engaging portions 4, disposed longitudinally of the device and extending from opposite ends of the same, as clearly illustrated in Fig. 1 of the accompanying drawings. The device is adapted to form a link of a chain 5, and it is designed to be arranged at an intermediate point thereof, and it is provided at the ends of the shank or body portion 3 with eyes or openings 6 to receive the adjacent links. The bills or engaging portions 4 extend from opposite sides of the end enlargements of the shank or link and are provided with slightly-curved inner faces which are convex to form flaring mouths or entrances to the slots or openings between the shank or body 3 and the engaging portions 4. The outer faces of the engaging portions 4 are oppositely beveled and slightly curved to present concave faces and cause the engaging portions to lie as closely to the body or shank as practicable. The ends of the shank or body are enlarged to form the eyes, and they are provided with lateral projections 7, extending laterally beyond the plane of the bills or engaging portions of the hooks and forming guards which effectually prevent grass, earth, and other matter from entering and clogging the mouths of the hooks. The ends of the shank or body portion are rounded, as shown, and the side edges of the projections or guards are concavely curved and form continuations of the adjacent faces of the shank or body portion.

The chain is designed to be provided at its ends with the ordinary hooks, and the double hook is adapted to receive a link bodily within either of the spaces between the shank or body portion and the engaging portions, the adjacent links at the ends of the engaged link forming stops to prevent any longitudinal movement of the device on the chain. The device is adapted to engage the chain at any point and is capable of being used as a grapple for making hitches for looping and shortening the chain and the like, and it is also capable of obviating the necessity of doubling long chains, which is inconvenient, especially in cold weather.

It will be seen that the double hook is exceedingly simple and inexpensive in construction, that it is adapted to form an intermediate link of a chain, and that it is capable of engaging the same at any point, whereby it may be readily employed for making hitches, looping and shortening chains, and similar operations. It will also be apparent that it is adapted to obviate the necessity of doubling long chains to provide a connection of the desired length and that it may be dragged along the ground without liability of clogging the spaces or openings between the shank or body and the engaging portions or bills.

Changes in the form, proportion, size, and the minor details of construction within the scope of the appended claims may be resorted to without departing from the spirit or sacrificing any of the advantages of this invention.

What is claimed is—

1. A device of the class described comprising a central shank or body provided at its ends with eyes adapted to receive the links of the chain to enable the device to be arranged at an intermediate point along the same, the longitudinal engaging portions or bills extending from opposite sides of the eyes of the link or body and terminating short of the ends of the device, and the projections or guards extending from the sides of the said eyes beyond the plane of the engaging portions or bills, whereby the openings or spaces between the shank or body and the engaging portions or bills are prevented from becoming clogged, substantially as described.

2. A device of the class described comprising a shank or body, longitudinal bills or engaging portions lying at the sides of the shank or body and extending from the ends thereof, and the lateral projections arranged at the ends of the shank or body and forming bars projecting beyond the plane of the terminals of the engaging portions or bills, whereby the spaces or openings between the latter and the shank or body are prevented from becoming clogged when the device is dragged along the ground, substantially as described.

In testimony that I claim the foregoing as my own I have hereto affixed my signature in the presence of two witnesses.

DELOS WILLIAMS.

Witnesses:
J. W. CANFIELD,
H. M. OSBORN.